June 17, 1958  A. G. MUELLER  2,839,714
GRID PHASE SHIFT CIRCUITS
Filed Nov. 18, 1955

INVENTOR.
ARMAND G. MUELLER
BY

United States Patent Office 2,839,714
Patented June 17, 1958

2,839,714

GRID PHASE SHIFT CIRCUITS

Armand G. Mueller, Wauwatosa, Wis., assignor to Square D Company, Detroit, Mich., a corporation of Michigan Application November 18, 1955, Serial No. 547,708

9 Claims. (Cl. 318—331)

The present invention relates to grid phase shift circuits and more particularly, to a grid phase shift circuit for producing a grid voltage which is derived from the voltage appearing across a tube and shifted in phase.

An object of the present invention is the provision of an improved circuit for driving an A. C. grid control signal from the A. C. voltage applied across the tube and shifted in phase from said tube voltage.

Another object is to provide a resistor-capacitor network for deriving a grid control signal from the voltage applied across the tube and a single phase half wave motor control circuit.

A further object of the invention is the provision of a circuit for retarding the phase of an A. C. voltage applied across the tube supplying a motor and superimposing the retarded signal on a D. C. potential to control said tube.

Still another object is to provide a circuit for retarding the phase of an A. C. supply voltage applied across a grid controlled gaseous discharge tube supplying the armature voltage to a motor and superimposing the retarded signal on a D. C. reference potential to control the current output of said tube and voltage supplied to the armature of said motor.

Further objects and features of the invention will be readily apparent to those skilled in the art from the specification and appended drawings illustrating certain preferred embodiments in which.

Figure 1:
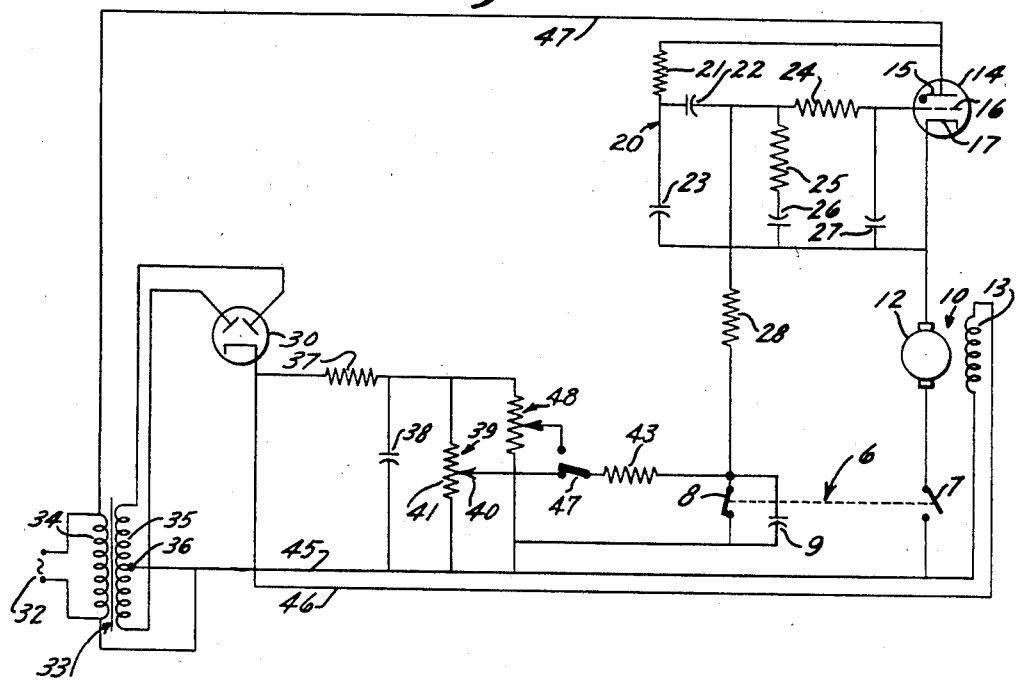
Figure 1 is a circuit diagram illustrating a preferred embodiment of the invention.

Referring now to the drawings, there is shown in Figure 1, a motor control circuit including a full wave motor shunt field supply providing a reference voltage for regulating the speed of a motor 10 and a half wave supply for the armature 12 of motor 10 which is regulated by the reference voltage. The armature supply circuit is connected to an A. C. supply source 32, having one side connected to the anode 15 of the grid control gaseous discharge tube or thyratron 14 and to the grid and cathode of said tube through a phase shifting circuit 20. The transformer primary 34 is connected across said source, having one side connected to the ground return line 45; the midtap 36 of the transformer secondary 35 may also be connected to the ground return or to ground return through a biasing impedance for developing a negative reference potential.

The armature circuit is completed by operation of switch 6 having contact arms 7 and 8 which positions contact arm 7 on its associated contact connecting the motor armature 12 to ground return 45 from the cathode 17 of the tube 16. A grid excitation voltage $e_g$ is provided by the phase shift circuit 20; the phase of the grid voltage $e_g$ is fixed relative to the supply or anode voltage $e_a$ and lags the anode voltage $e_a$ by approximately 90°. The phase shift circuit includes an RC combination comprising a resistor 21 and capacitor 23 connected in series to shift the phase of the anode voltage and forms an A. C. path from the anode to cathode of tube 14. The junction between resistor 21 and capacitor 23 is A. C. coupled to the grid 16 through the A. C. coupling and direct current blocking capacitor 22 and current limiting resistor 24. A stabilizing circuit including resistor 25 and capacitor 26 in series connects the junction of resistor 24 and coupling capacitor 22 to the cathode 17; the grid to cathode coupling capacitor 27 connects the grid 16 of the tube 14 to cathode 17.

The motor shunt field and reference supply includes a full wave rectifier 30, having a pair of anodes connected across the transformer secondary 35. The output or cathode of tube 30 is connected to the ground return 45 through the motor shunt field 13 or through the reference voltage circuit including resistor 37 in series with the parallel circuit including capacitor 38, resistor element 41 of potentiometer 39 and resistor element 42 of potentiometer 48.

The portion of the reference voltage taken off the potentiometer 39 by the adjustable tap 40 is coupled to the grid 16 through resistors 43, 28 and 24 in series, providing a D. C. control potential or bias on the grid of tube 14. Capacitor 9 is connected to the junction of resistors 43 and 28 and to ground to provide a delay in transient voltages during the adjustment of the potentiometer 39. Resistor 43 limits the current to ground when contact arm 8 is connected to its associated contact.

In operation, the switch or contactor 6 is operated, positioning contact arm 8 in open circuit position and contact arm 7 in closed position to complete the circuit from supply through the motor armature 12. The remainder of the circuit is normally energized and the switch having a contact arm 47 is positioned to select a portion of the reference voltage from the potentiometer 39, as shown in the drawing, or potentiometer 48 in the alternative position. With contact arm in either position, a portion of the reference voltage is applied to the grid of tube 14 to provide a D. C. potential thereon for controlling the firing angle of the tube and resulting voltage on the motor armature 12. The C. E. M. F. generated by the motor determines the feedback voltage applied to the cathode and in combination with the grid bias or D. C. potential on the grid 16 determines the firing angle of the tube, assuming the anode voltage $e_a$ and A. C. component or ripple on the grid to be substantially constant.

Figure 2:
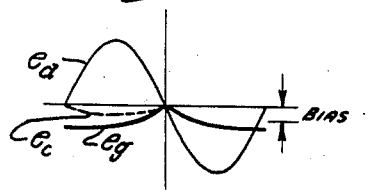
Figures 2 and 3 are diagram wave forms illustrating the principles of operation of the control circuit.
Figure 3:
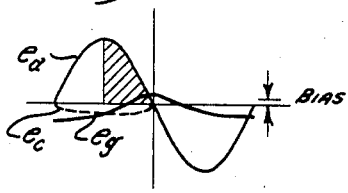

The diagrams in Figures 2 and 3 show the principles of operation of the control circuit wherein $e_a$ may be a sine wave supplied from the A. C. source 32 and applied to the anode 15 of the tube 14; $e_c$ is a critical grid voltage and $e_g$ is the voltage on the grid 16 and may comprise a sine wave superimposed on a D. C. potential and delayed or shifted in phase to lag the anode voltage by approximately 90°. The bias indicated in Figures 2 and 3 is determined by the relative D. C. voltages or bias between the grid 16 and cathode 17. In Figure 2 the D. C. grid bias is negative and the grid voltage $e_g$ does not intersect the critical grid voltage $e_c$ of the tube, therefore the tube remains nonconductive throughout the cycle and no voltage is applied to the motor armature 12. Increasing the amount of reference voltage applied to the grid 16 raises the grid voltage to a level intersecting the critical grid voltage, firing the tube at the instant in the cycle the two voltages intersect, for example: as shown in Figure 3. The current continues to flow through the tube each cycle until the anode voltage falls below the ionization potential.

The current wave form during the conducting portion of the cycle is dependent upon the motor electrical characteristics. The wave form of applied anode voltage has been indicated by shading. It can be readily seen that the armature voltage applied to the motor can be varied by controlling the tube firing angle. The firing angle can be varied over substantially the 180° positive portion of the anode voltage $e_a$ by varying the cathode to grid D. C. potential wherein the grid voltage $e_g$ intersects the critical voltage $e_c$, earlier in the half cycle along the inclined slope of the grid voltage $e_g$.

The grid to cathode D. C. potential is the regulating signal. Assuming the reference signal is increased in voltage producing an increased D. C. voltage on the grid 16; the grid voltage $e_g$ would intersect the critical grid voltage $e_c$ earlier in the positive half cycle of the anode voltage $e_a$, increasing the tube conduction. However, the C. E. M. F. of the motor armature 12 will build up in response to the increased current and voltage applied, reducing the cathode to grid D. C. potential, moving the intersection of the grid voltage $e_g$ and critical grid voltage $e_c$ to a time later in the positive half cycle and leveling off at a voltage or point in the cycle consistent with the speed as set by the potentiometer 39 or 48.

Figure 4A:
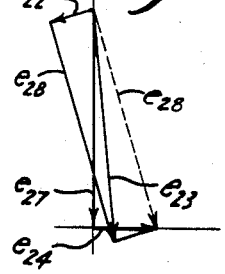
Figures 4 and 4 are vector diagrams showing the relative phase and magnitude of voltages in the phase shift circuit.
Figure 4:
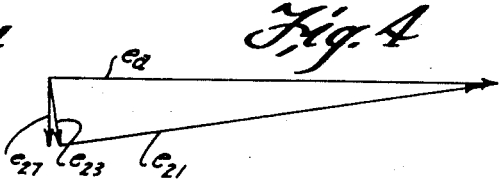

The phase shift circuit 29 delays and attenuates the anode supply voltage and applies the resultant to the grid of the tube 14, lagging the anode voltage $e_a$ by approximately 90°. Figures 4 and 4a are vector diagrams showing the relative phase and magnitudes of voltages in the phase shift circuit to produce a resultant ripple voltage on the grid of the desired magnitude lagging the anode voltage by 90°. In Figure 4 using $e_a$ as a reference a first RC combination including; the capacitor 23 in series with a relatively large resistor 21 develops a voltage $e_{23}$ across capacitor 23 lagging the anode supply voltage $e_a$ and a voltage $e_{21}$ across the resistor 21 leading $e_a$. Figure 4a shows the vectors enlarged for better illustration retaining $e_a$ as a reference and the voltage across coupling or direct current blocking capacitor $e_{22}$ lagging $e_{23}$ and $e_{28}$ across resistor 28 leading $e_{23}$. The A. C. component of the voltage $e_{28}$ is applied across a second RC combination including a relatively small current limiting resistor 24 and grid to cathode coupling capacitor 27 producing a voltage $e_{27}$ on the grid 16 lagging the anode voltage $e_a$ by substantially 90°.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a motor control circuit having a grid controlled gaseous discharge tube for rectifying and controlling the voltage supply from an A. C. source, a resistor capacitor network for producing substantially a 90° lag in phase between the anode and grid voltages comprising; a first RC circuit including a first resistor connected in series with a first capacitor directly across said tube for deriving a voltage $e_1$ directly from the anode and lagging said anode voltage, a second RC circuit including a second resistor and capacitor coupled to said first capacitor and to the grid of said tube for shifting the phase of $e_1$ to lag the anode voltage by approximately 90°, a control circuit including a source of D. C. control potential, a resistance element connected between said source and said RC circuits, and a D. C. blocking condenser connecting said RC circuits and connected between the resistance element and said first RC circuit for blocking said D. C. potential.

2. In a motor control circuit having a single grid controlled gaseous discharge tube for rectifying and controlling the voltage supply from single phase A. C. source to the motor armature, a resistor-capacitor network for producing substantially a 90° phase lag between the anode and grid voltages comprising; a first RC circuit including a first resistor connected in series with a first capacitor directly across said tube for deriving a voltage $e_1$ directly from the anode and lagging said anode voltage, a second RC circuit including a second resistor and capacitor further retarding and coupling said voltage $e_1$ to the grid of said tube to lag the anode voltage by approximately 90°, a control circuit including a source of D. C. control potential, a resistance element connected between said source and said RC circuits, and a D. C. blocking condenser connected between said RC circuits and the resistance element and said first RC circuit for blocking said D. C. potential.

3. A regulated supply for controlling the speed of a motor comprising; an armature circuit including an A. C. source, a discharge device having an anode, cathode and control grid, and a resistor-capacitor network connected across said device for regulating the voltage applied to said armature including a first resistor connected to said anode and in series with a first capacitor connected to said cathode for producing a delayed voltage $e_1$ of the desired magnitude across said capacitor, second third and fourth resistors having a common junction; an A. C. coupling capacitor connected between the junction of said first resistor and capacitor, and said common junction; a source of D. C. reference voltage for controlling the speed of the motor, said second resistor connecting said source to the control grid through said fourth resistor, a capacitor element connecting said third resistor to the cathode of said device for stabilizing said circuit and a third capacitor coupling the cathode and grid of said device directly whereby the anode voltage is retarded, superimposed on the D. C. reference voltage and applied to the control grid to control the output voltage of said device and the speed of said motor.

4. In a control circuit, a discharge device having a cathode, anode and control grid, means for coupling said device to an alternating current source for applying a substantially symmetrical alternating voltage to said anode, a phase shift network coupled to said device for deriving a grid signal from said symmetrical voltage and lagging said voltage by substantially 90° including an impedance phase shifting circuit connected across said device to produce a voltage lagging the anode voltage by substantially 90°, circuit means including a capacitor connected to said impedance circuit coupling said lagging voltage to said grid for controlling said device.

5. In a control circuit, a discharge device having a cathode, anode and control grid, means for coupling said device to an alternating current source for applying a substantially symmetrical alternating voltage to said anode, a phase shift network coupled to said device for deriving a grid signal from said symmetrical voltage and lagging said voltage by substantially 90° including a resistor and capacitor connected in series across said device to produce a voltage across said capacitor lagging the anode voltage by substantially 90°, circuit means including a capacitor connected to said resistor-capacitor circuit coupling said lagging voltage to said grid, a source of direct current grid biasing potential, circuit means for connecting said source to the grid of said device whereby said coupling capacitor blocks the potential from the resistor-capacitor circuit.

6. In a control circuit, a discharge device having a cathode, anode and control grid, means for coupling said device to an alternating current source for applying a substantially symmetrical alternating voltage to said anode, a phase shift network coupled to said device for deriving a grid signal from said symmetrical voltage and lagging said voltage by substantially 90° including a resistor and capacitor connected in series across said device to produce a voltage across said capacitor lagging the anode voltage by substantially 90°, circuit means including a capacitor connected to said resistor-capacitor circuit coupling said lagging voltage to said grid, a grid resistor connected directly to said grid in series with said coupling capacitor, and a capacitor directly coupling the grid and cathode of said device whereby the grid signal is phased back further to control said device.

7. An electronic motor control circuit including a direct current motor having an armature and field windings supplied from an alternating current source, field circuit supply means including a rectifier coupling said field to said source and providing direct current excitation of said field, an armature voltage regulating circuit connecting said armature to said source comprising a discharge device connected in series with said armature winding and including an anode, cathode and control grid wherein the armature winding is connected in the cathode circuit of said device, a phase shift network including an impedance connected to said source and said anode, a first capacitor connecting said impedance to said cathode, said impedance-capacitor combination substantially reproducing the voltage waveform of said source to provide an alternating grid signal voltage substantially in phase quadrature lagging said source, a reference voltage circuit coupled to said field circuit supply means and said grid including means producing an adjustable direct current output potential biasing said grid, grid circuit means including a capacitor coupling said combinaton to said grid and reference voltage circuit output whereby the alternating grid signal is superimposed on said direct current biasing potential to produce a grid control signal for regulating the conduction of said discharge device.

8. An electronic motor control circuit including a direct current motor having an armature and field windings supplied from an alternating current source, field circuit supply means including a rectifier coupling said field to said source and providing direct current excitation of said field, an armature voltage regulating circuit connecting said armature to said source comprising a discharge device connected in series with said armature winding and including an anode, cathode and control grid wherein the armature winding is connected in the cathode circuit of said device, a phase shift network including a resistor connected directly to said source and said anode, a capacitor in series with said resistor across said device connecting said resistor to said cathode, said resistor-capacitor combination substantially reproducing the voltage waveform of said source to provide an alternating grid signal voltage substantially in phase quadrature lagging said source, a reference voltage circuit coupled to said field circuit supply means and said grid including means producing an adjustable direct current output potential biasing said grid, grid circuit means including a capacitor coupling said combination to said grid and reference voltage circuit output whereby the alternating grid signal is superimposed on said direct current biasing potential to produce a grid control signal for regulating the conduction of said discharge device.

9. An electronic motor speed control circuit including a direct current motor having an armature and field windings supplied from an alternating current source, field circuit supply means including a rectifier coupling said field to said source and providing direct current excitation of said field, an armature voltage regulating circuit connecting said armature to said source comprising a discharge device including an anode, cathode and control grid and a phase shift network including a resistor connected directly to said source and said anode, said armature winding connected in the cathode circuit of said device and producing a counter E. M. F. voltage in response to the relative movement in the magnetic field of said excited field winding, a capacitor in series with said resistor across said device connecting said resistor to said cathode, said resistor-capacitor combination substantially reproducing the voltage waveform of said source to provide an alternating grid signal voltage substantially in phase quadrature lagging said source, a reference voltage circuit coupled to said field circuit supply means and said grid including means producing an adjustable direct current output potential biasing said grid, grid circuit means including a capacitor coupling said combination to said grid and reference voltage circuit output whereby the alternating grid signal is superimposed on said direct current biasing potential to produce a grid control signal, said discharge device being responsive to the counter E. M. F. of said armature winding and grid control signal to regulate the speed of said motor.

References Cited in the file of this patent

UNITED STATES PATENTS

| | | |
|---|---|---|
| 2,522,520 | Knauth et al. | Sept. 19, 1950 |
| 2,524,759 | Brown | Oct. 10, 1950 |
| 2,537,677 | Knauth et al. | Jan. 9, 1951 |
| 2,552,206 | Moyer | May 8, 1951 |